United States Patent

Seguenot et al.

[11] Patent Number: 6,021,706
[45] Date of Patent: Feb. 8, 2000

[54] FILTER HOLDER FOR AN ESPRESSO-TYPE COFFEE MACHINE

[76] Inventors: Gérard Seguenot, La Ferme-Jolie, F-72610 Champfleur; Joël Landais, 10, rue de la Vallée, F-61250 Conde-sur-Sarthe, both of France

[21] Appl. No.: 09/117,341

[22] PCT Filed: Jan. 23, 1997

[86] PCT No.: PCT/FR97/00128

§ 371 Date: Feb. 5, 1999

§ 102(e) Date: Feb. 5, 1999

[87] PCT Pub. No.: WO97/26816

PCT Pub. Date: Jul. 31, 1997

[30] Foreign Application Priority Data

Jan. 25, 1996 [FR] France .................................. 96 00883

[51] Int. Cl.[7] .................................................. A47J 31/06
[52] U.S. Cl. ............................ 99/319; 99/323; 99/302 R; 99/307
[58] Field of Search .............................. 99/293, 295, 292, 99/302 R, 319, 318, 323, 307; 210/455, 474, 477, 481

[56] References Cited

U.S. PATENT DOCUMENTS 4,255,265  3/1981  Greutert ................................ 99/319 X
4,644,856  2/1987  Borgmann ................................ 99/295

FOREIGN PATENT DOCUMENTS 0 097 129  12/1983  European Pat. Off. .
0 402 326  12/1990  European Pat. Off. .
0 555 775   8/1993  European Pat. Off. .
0 663 172   7/1995  European Pat. Off. .
  6709182  12/1968  Netherlands .

*Primary Examiner*—Reginald L. Alexander
*Attorney, Agent, or Firm*—Young & Thompson

[57] ABSTRACT

A filter holder including a scoop (1) provided with a handle (2) and designed to hold a filter (3) that consists of a housing (4) and a perforated bottom wall (5) and is movably mounted in the space defined by the housing (4) via a height adjustment device (6). This device (6) includes a stack consisting of at least one ring (8) adjacent to the bottom wall (5) and an opposed ring (9) coaxial with the ring. The respective side surfaces (10–11) of the rings include an alternated series of staggered angled (12) and horizontal (13B–13H) surfaces, and an alternated series of staggered opposed angled (14) and opposed horizontal (15B–15H) surfaces, as well as an actuating member (16) movably mounted on the cup (1) for causing relative movement of the ring (8) and the opposite ring (9).

11 Claims, 2 Drawing Sheets

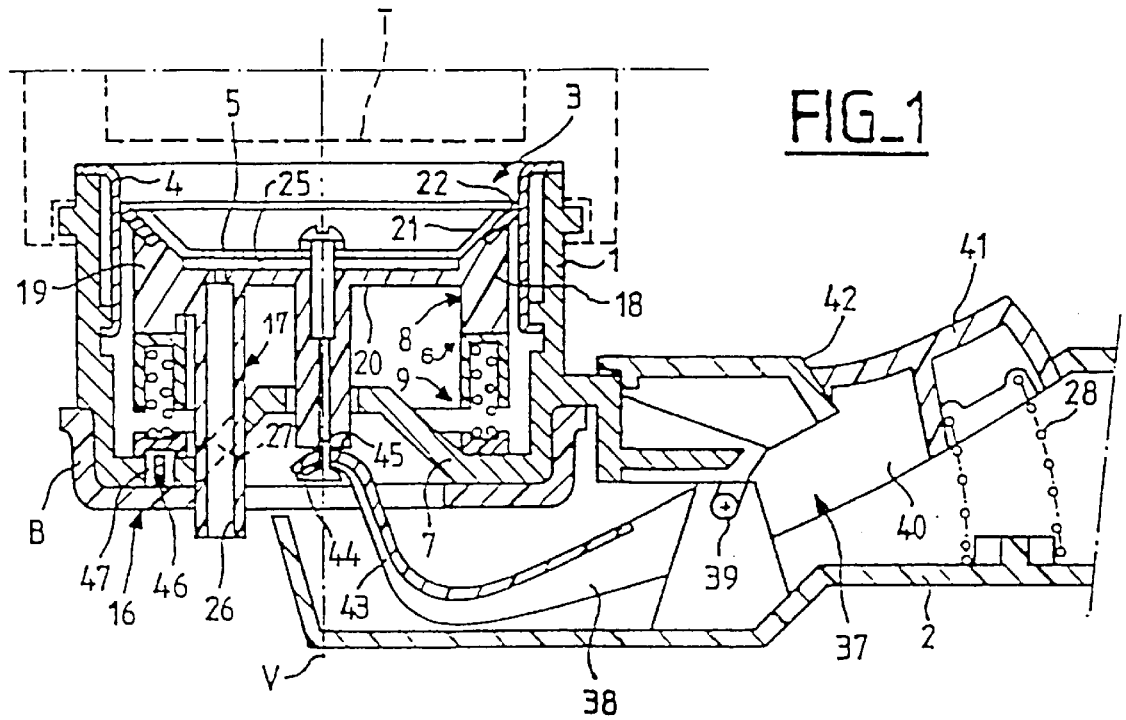

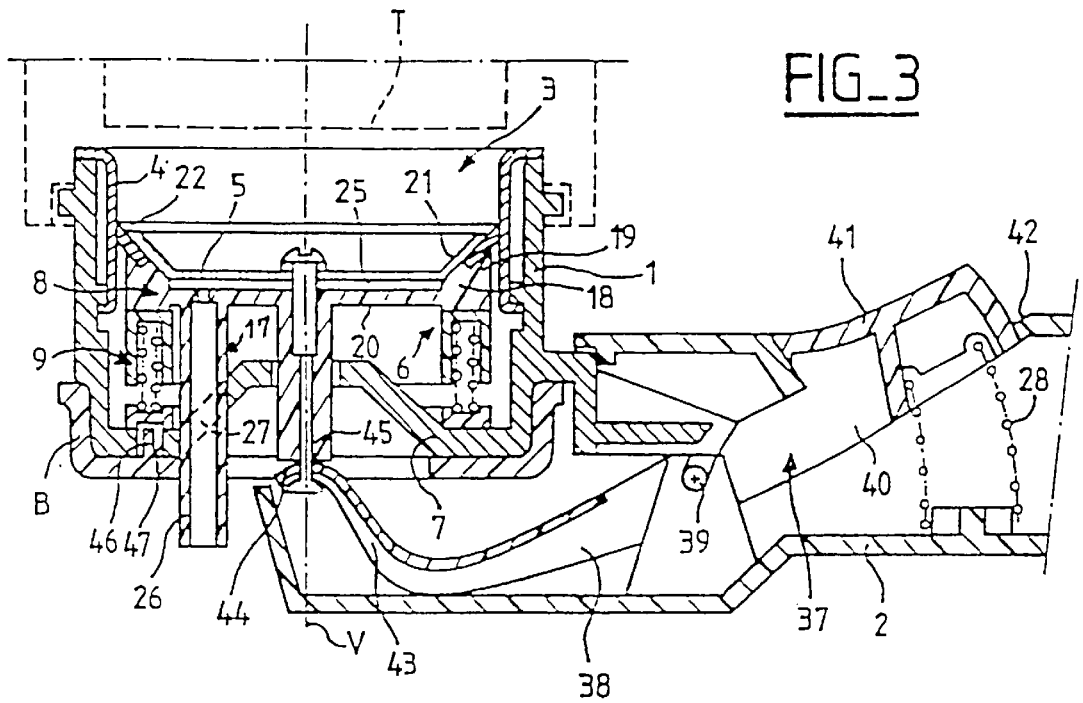
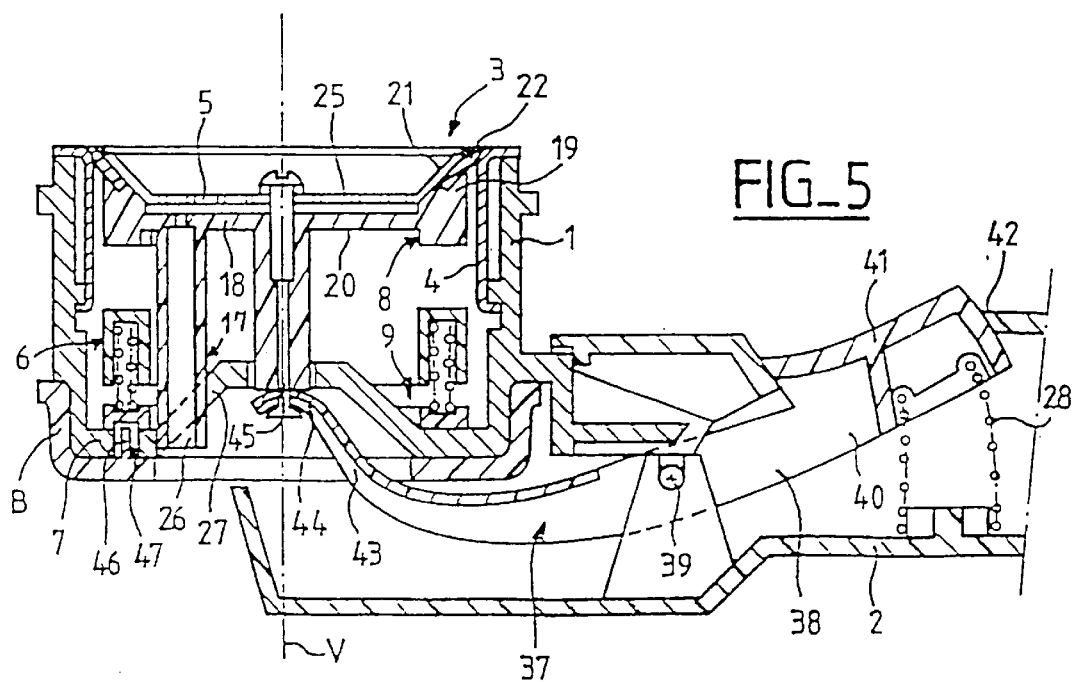

FILTER HOLDER FOR AN ESPRESSO-TYPE COFFEE MACHINE

CROSS REFERENCE TO RELATED APPLICATION

This application is the 35 U.S.C. §371 national stage of International application PCT/FR97/00128, filed on Jan. 23, 1997, which designated the United States of America.

FIELD OF THE INVENTION

The present invention relates to a filter holder adapted to be mounted on the head of a coffee making machine of the "Espresso" type, and comprising a cup provided with a lateral handle and adapted to receive a filter formed by a cage with a lateral cylindrical wall and a perforated bottom.

The invention relates more particularly to a filter holder whose perforated bottom of the filter is movably mounted in the space delimited by the cage by means of a height adjustment device thereby permitting obtaining various dosages of coffee to prepare one or several cups of infusion.

BACKGROUND OF THE INVENTION

In the filter holders of this type, the device for height adjustment generally comprises a complicated system of rods requiring locking at different heights so as to find the precise positions of the perforated bottom in the cage of the cup. Thus, in the machines of the "Espresso" type, the pressure of the hot water supplied by the machine pump being about 15 bars, it is imperative that the perforated bottom be maintained locked at different heights during the infusion operation so as to guarantee the choice of infusion selected by the user, and to avoid any abrupt decompression which would give rise to the destruction of the filter holder and with risk of projection of hot steam and an infusion outside the filter.

Moreover, devices have been proposed for locking with a screw-nut assembly, but as will be understood, the adjustment as to height becomes long, difficult and imprecise during passage from one infusion operation according to a choice of cups, to another infusion operation with another choice of cups.

SUMMARY OF THE INVENTION

The invention has particularly for its object to simplify the height adjustment device by eliminating the drawbacks described above.

According to the invention, the height adjustment device comprises, between the perforated bottom and the bottom of the cup, a stack of at least one crown mounted adjacent the bottom and a coaxial counter-crown which comprise respectively on their opposite surfaces an alternate succession of ramps and flats and of counter-ramps and counter-flats, as well as an actuating member movably mounted on the cup and adapted to give rise to displacement in relative rotation between the crown and the counter-crown to cause the perforated bottom to operate different positions of height in the cage.

Thanks to the invention, there is obtained a filter carrier with a good ability to be used, guaranteeing not only the precise and identical regulation for each selection of dosage of grounds, but also high safety of operation because all the mechanical stresses due to the pressure of the water are localized on the flats and counter-flats which face each other and which thus define stable bearing surfaces.

According to another particularly interesting characteristic of the invention, the counter-crown is formed of two spaced upper and lower annuli connected in rotation by anchoring means and between which are interposed resilient members, such that the upper ring bearing the counter-ramps and the counter-flats will be movably mounted in translation relative to the lower ring.

Thus, this construction of counter-crown in two pieces mounted resiliently together, permits obtaining, in the course and at the end of the infusion operation, a self-packing of the coffee grounds which ensures, on the one hand, a complete extraction of the edible and aromatic constituents of the grounds, and on the other hand the production of a grounds tablet which is practically dry and easily disposable.

BRIEF DESCRIPTION OF THE DRAWINGS

The characteristics and advantages of the invention will become further apparent from the description which follows, by way of non-limiting example, with reference to the accompanying drawings, in which:

FIG. 1 is a partial vertical cross-sectional view of a filter carrier according to the invention, mounted on a head of a coffee machine and showing the bottom of the filter in the "one cup" position;

FIG. 2 is a schematic cross-sectional view of a partial development of a device for regulating in height according to the invention and shown in a position corresponding to that of FIG. 1;

FIG. 3 is a view similar to that of FIG. 1, but in which the bottom of the filter is in the "two cup" position;

FIG. 4 is a view similar to that of FIG. 2, but in which the position of the height adjustment device corresponds to that of FIG. 3;

FIG. 5 is a partial vertical cross-sectional view of the filter carrier shown in FIG. 1 and in which the bottom of the filter occupies an ejection position.

DETAILED DESCRIPTION OF THE INVENTION

The filter holder shown in FIGS. 1, 3 and 5 is adapted to be mounted on a T head (shown in broken lines) of a coffee machine of the Espresso type operating generally speaking with an electric pump adapted to supply hot water under a pressure, for example, of about 15 bars. As is known per se, the filter carrier is mounted on the T head by means of a bayonet system and comprises for this purpose a cup 1 provided with a portion of the bayonet and a lateral handle 2. The cup 1 is adapted to receive a filter 3 formed of a cage 4 with a cylindrical side wall anchored in the cup 1, and a perforated bottom 5 of metal.

So as to obtain various dosages of ground coffee to prepare one or several cups of coffee, the bottom 5 is movably mounted in the space delimited by the cage 4, along a vertical axis V coinciding with the axis of said cage, by means of a height adjustment device 6.

According to the invention, the height adjustment device 6 comprises, between the perforated bottom 5 and the bottom 7 of the cup 1, a stack of at least one crown 8 mounted adjacent the perforated bottom 5, and a counter-crown 9 coaxial to said crown and comprising (see FIGS. 2 and 4) respectively on lateral face-to-face surfaces 10 and 11, a succession of alternate ramps 12 and flats 13B–13H, and counter-ramps 14 and counter-flats 15B–15H, as well as an actuating member 16 movably mounted on the cup 1 and adapted to give rise to displacement in relative rotation between the crown 8 and the counter-crown 9 so as to cause the perforated bottom 5 to occupy different positions in height in the cage 4.

In a preferred embodiment and as shown, the crown 8 is secured to the bottom 5 and comprises means 17 for immobilizing it in rotation relative to the cage 4, whilst the counter-crown 9 is movably mounted in rotation about an axis common to the stack and corresponding to the axis V, and is secured to the actuating member 16, such that the rotation of the counter-crown 9 gives rise to different coincidences between the flats 13B–13H and the counter-flats 15B–15H, thereby giving rise to different heights of the bottom 5 in the cage 4.

As shown clearly in FIGS. 2 and 4, the flats 13B–13H and counter-flats 15B–15H are located at two different heights so as to define two precise and stable positions for the bottom 5 corresponding for example to a cup or two cups of infusion of coffee.

Thus, thanks to the height adjustment device, the user can prepare as desired and automatically one or two cups of coffee, by simple actuation of the actuating member 16, between two predefined abutments, which determine by rotation the superposition of the flats 13H and counter-flats 15H (FIG. 2) for one cup and the flats 13B and 15H (FIG. 4) for two cups.

In the embodiment shown in FIGS. 1, 3 and 5, the perforated bottom 5 is mounted on a cylindrical support 18 whose peripheral edge 19 is adapted to slide in the cage 4, and whose lower surface 20 carries, on the one hand, the crown 8, and on the other hand the immobilization means 17. So as to ensure perfect sealing between the bottom 5 and the cage 4, said bottom carries on its peripheral edge 21 an annular sealing joint 22 which also bears on the peripheral edge 19 of the support 18.

On the other hand, the support 18 has on its upper surface a recess 25 which is covered by the perforated bottom 5 and which communicates with the outside of the cup 1 through at least one descending pipe 26 for flow of the infusion which passes for this purpose through an opening 27 provided in the bottom 7 of the cup. Preferably, the support 18 comprises two pipes 26, of which only one is shown, and which also passes through another opening (not shown).

So as to obtain a less costly embodiment and to facilitate the construction of the filter holder, the rotational immobilization means 17 is constituted by the pipe or pipes 26 which pass with a small play through the opening or openings 27, the pipe or pipes 26 having a length as to permit the displacement in height of the bottom 5 over the height of the cage 4.

Of course, the immobilization means 17 could be embodied according to another equivalent construction such as, for example, a lateral indexing between the side wall of the cup 1 and the crown 8.

So as to apply the crown 8 and the counter-crown 9 in engagement with each other, the support 20 is urged toward the lower portion of the cage 4 by means of a spring 28.

According to another important characteristic of the invention, the counter-crown 9 is formed by two spaced rings: an upper ring 30 and a lower ring 31, connected in rotation by anchoring means 32, and between which are interposed resilient members 34, such that the upper ring 30, carrying the counter-ramps 14 and counter-flats 15B–15H, will be movably mounted in translation relative to the lower ring 31. The guidance in translation is effected by bosses 33 carried by the ring 31 and which enter with a slight play into recesses 33' provided in the upper ring 30. Preferably, the resilient members 34 are constituted by compression springs, and are arranged preferably below the different counter-flats 15H so as to equalize the pressures of the flats 13B–13H on said counter-flats 15H.

As will be explained later, this construction of the counter-crown 9 in two rings separated by springs permits obtaining, during the infusion under high pressure, a self-packing function of the grounds gradually upon contact with hot water.

In addition to the height adjustment device 6, the filter holder is provided with a device 37 for ejecting the cake of grounds, comprising a lever 38 which is mounted pivotally on a pivot 39 arranged in the region of the junction between the handle 2 and the cup 1, and which comprises at one end 40 a button 41 projecting from an opening 42 provided in the handle, and at the other end 43 a coupling member 44 with a pin 45 connected to the perforated bottom 5 and secured to the lower surface 20 of the support 18, said lever 38 being also subjected to a return spring 28 of the support 20 in the lower region of the cage 4. As will be seen in the figures, the spring 28 is a compression spring and is arranged below the end 40, such that the hook always pulls the support toward the bottom 7 of the cup.

According to a preferred embodiment, the pin 45 has one end in the form of a ring whilst the coupling member 44 is formed by a hook which passes freely through the ring to follow the displacement of the support 18.

So as to explain the relationship of the various characteristics described above, there will now be described the operation of the filter holder according to the invention. During a first operation, the user, holding the filter carrier by the handle 2 in one hand, manipulates, with the other hand, the actuating member 16. In the present case, this member 16 is formed by a ring B mounted coaxially to the counter-crown 9 and outside the cup 1. This ring comprises a drive finger 46 which projects through an opening 47 of arc shape provided in the bottom 7 of the cup 1 and which comes into engagement with the counter-crown 9 so as to drive it in rotation about an angle defined by the ends of the opening 7 forming abutments. The ring B is maintained about the cup 1 by any means passing through the opening 47 and preferably by the finger 46 which carries for this purpose lateral tongues (not shown) which come into engagement with the internal edge of the opening 47.

If the user chooses to prepare one cup (FIG. 1), the ring B brings the counter-crown 9 and the crown 8 to the position shown in FIG. 2 and in which the flats 13H bear on the counter-flats 15H. This position brings the support 18 and hence the perforated bottom 5 into the upper portion of the cage, leaving a small space between the bottom and the upper edge of the filter 3 to receive the ground coffee.

In a second operation, the user fixes the filter carrier on the head T of the machine by means of the bayonet device. Then, the machine supplies hot water under pressure (15 bars) to cause the grounds to swell and to cause the infusion of coffee which then flows through the pipe or pipes 26.

In the course of this preparation of infusion, the swelling of the ground coffee exerts, in addition to the pressure of the water, a pressure on the perforated bottom 5 which is transmitted by the crown 8 to the ring 30 of the counter-crown 9, and thence on the springs 34 which compress until the two rings 30 and 31 come into contact. During flow of the infusion, the mass of the ground coffee slowly shrinks, permitting the bottom 5 to rise very slightly under the pressure of the springs 34.

At the end of filling the cup with the infusion, the user stops the operation of the pump, which cuts off the supply of water under pressure. At this time, the springs 34 strongly press the ring 30 upwardly, thereby driving the bottom 5 toward the head T of the machine and giving rise to a squeezing of liquid from the ground coffee so as to obtain an almost dry rigid cake.

In a third operation, the user unlocks the filter holder from the head and proceeds to eject the cake of coffee grounds from the filter 3. To do this, while holding the handle he presses with his thumb on the button 41 against the spring 28, causing pivoting of the lever 38 whose hook, bearing on the pin 45, presses the support 18 upwardly of the cage 4 to bring to the position shown in FIG. 5 the perforated bottom 5 adjacent the upper edge of the cage 4, and hence to bring the cake of coffee grounds outside the filter 3. In the course of this sliding in the cage, the support 18 and its crown 8 are guided linearly by the pipe or pipes 26, such that the adjustment device always keeps the selected adjusted position.

Thus, it will be understood that simple turning of the filter holder by means of the handle 2 will cause the cake of coffee grounds to fall from the filter 3.

When the user relaxes pressure on the button 41, the spring 28 causes the lever to pivot in the opposite direction, pulling by the hook on the ring and hence sliding the support 18 and the perforated bottom 5 in the direction of the bottom 7 of the cup to position the crown 8 and hence the flats 13H in bearing relationship against the counter-flats 15H, which is the initial position shown in FIG. 2.

Now let it be supposed that the user desires to prepare two cups of coffee. Starting from the position shown in FIGS. 1 and 2, the user grasps the ring B and by a counter-rotation movement in the direction of the arrow F of FIG. 4, causes by the finger 46 the counter-crown 9 to turn about the axis V. This rotation causes the counter-flats 15H to slide on the flats 13H, and the counter-ramps 14 on the ramps 12, to bring the counter-flats 15H against the flats 13B, thereby defining the position corresponding to two cups for which the perforated bottom 5 is located in the lower region of the cage 4, as shown in FIG. 3. As will be seen, in this position, the capacity of the filter 3 is substantially greater than the capacity shown in FIG. 1.

The other operations of infusion and ejection of the cake of coffee grounds take place in the same manner as explained above for the preparation of a single cup.

We claim:

1. Filter holder adapted to be mounted on a head (T) of a coffee machine of the "Espresso" type and comprising a cup (1) provided with a lateral handle (2) and adapted to receive a filter (3) in the shape of a cage (4) with a cylindrical side wall and a perforated bottom (5) and movably mounted in the space delimited by the cage (4) by means of a height adjustment device (6) permitting obtaining various dosages of ground coffee, wherein the height adjustment device (6) comprises, between the perforated bottom (5) and the bottom (7) of the cup (1), a stack of at least one crown (8) mounted adjacent the bottom (5) and a counter-crown (9) coaxial to said crown which comprise respectively on their lateral surfaces (10–11) opposite each other an alternating series of ramps (12) and flats (13B–13H) and counter-ramps (14) and counter-flats (15B–15H), as well as an actuating member (16) movably mounted on the cup (1) and adapted to give rise to a movement of relative rotation between the crown (8) and the counter-crown (9) to cause the perforated bottom (5) to occupy different positions of height in the cage (4); and wherein the crown (8) is secured to the bottom (5) and comprises means (17) for immobilization in rotation relative to the cage (4), whilst the counter-crown (9) is movably mounted in rotation and is secured to the actuating member (16), such that the rotation of the counter-crown (9) gives rise to different coincidences between the flats (13B–13H) and counter-flats (15B–15H).

2. Filter holder according to claim 1, wherein the flats (13B–13H) and counter-flats (15B–15H) are located at two different heights so as to define two precise positions of the bottom (5) corresponding to two doses of ground coffee.

3. Filter holder according to claim 1, wherein the perforated bottom (5) is mounted on a cylindrical support (18) whose peripheral edge (19) is adapted to slide in the cage (4) and whose lower surface (20) carries the crown (8), and the rotation immobilization means (17).

4. Filter holder according to claim 3, wherein the support (18) is returned by means of a spring (28) toward the lower region of the cage (4) and maintains the crown (8) and the counter-crown (9) in engagement with each other.

5. Filter holder according to claim 4, wherein the support (18) has on its upper surface (24) a recess (25) which is covered by the perforated bottom (5) and which communicates with the outside of the cup (1) by a pipe (26) for flow of infusion which passes through an opening (27) provided in the bottom (7) of the cup.

6. Filter holder according to claim 5, wherein the rotation immobilization means (17) is constituted by the pipe (26) which passes with slight play through the opening (27).

7. Filter holder according to claim 1, wherein the perforated bottom (5) carries on its peripheral edge (21) an annular joint (22) for sealing with the cage (4) of the filter (3).

8. Filter holder according to claim 1, wherein the counter-crown (9) is formed of two spaced rings, an upper ring (30) and a lower ring (31), connected in rotation by anchoring means (32) and between which are interposed resilient members (34), such that the upper ring (30) carrying the counter-ramps (14) and counter-flats (15B–15H) will be movably mounted in translation relative to the lower ring (31) by means of guide members.

9. Filter holder according to claim 8, wherein the resilient members (34) are constituted by compression springs, and are arranged preferably below the different counter-flats (15H).

10. Filter holder according to claim 1, wherein the actuating member (16) is a rotatable ring B mounted coaxially of the counter-crown (9) and outside the cup (1) and comprising a drive finger (46) projecting through an opening (47) provided in the bottom (7) of the cup and in engagement with the counter-crown (9).

11. Filter holder according to claim 1, further including a device (37) for ejecting coffee grounds comprising a lever (38) which is pivotally mounted on a pivot (39) arranged in the region of the junction between the handle (2) and the cup (1), and which comprises at one end (40) a button (41) projecting from an opening (42) of the handle, and at the other end (43) a coupling member (44) with a pin (45) connected to the perforated bottom (5), so as to bring the perforated bottom (5) to the level of the mouth of the cage (4) during actuation (9) of the button (41).

* * * * *